July 30, 1957     E. F. BANKSTON     2,801,386
TUBE TESTING SYSTEM

Filed May 7, 1951                     2 Sheets-Sheet 1

Earl F. Bankston
INVENTOR.

BY
Attorneys

July 30, 1957  E. F. BANKSTON  2,801,386
TUBE TESTING SYSTEM
Filed May 7, 1951  2 Sheets-Sheet 2
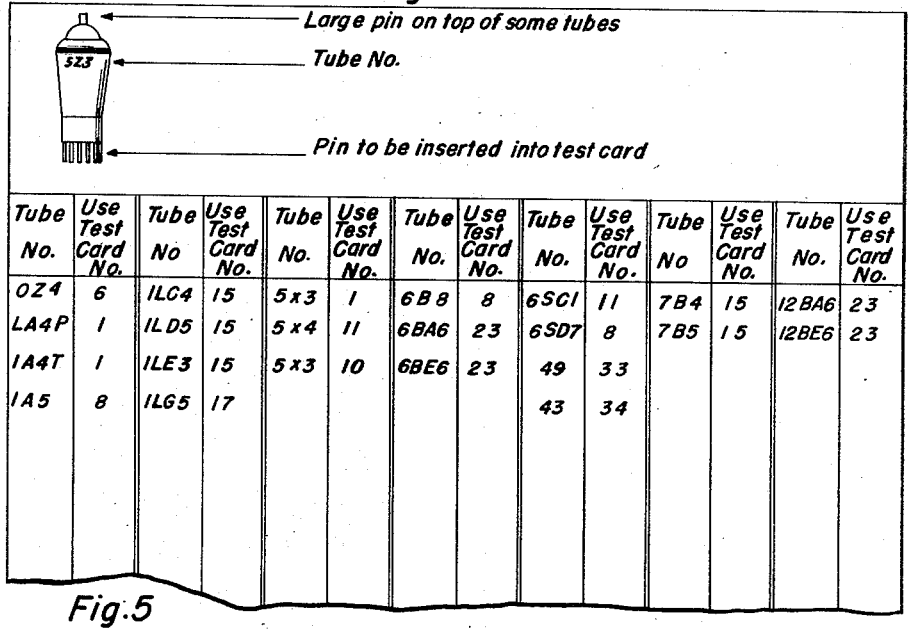
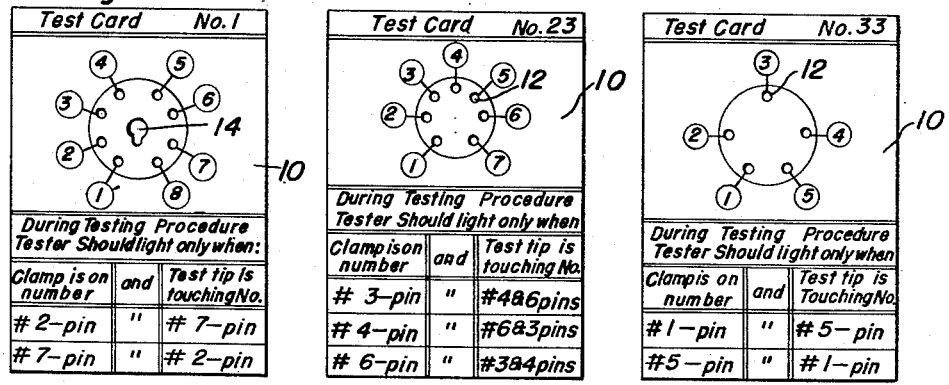
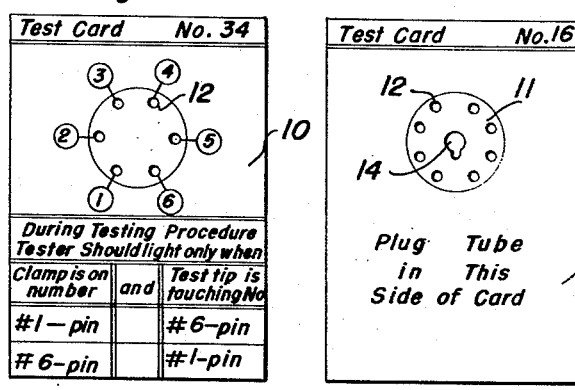
Earl F. Bankston
INVENTOR.

United States Patent Office 2,801,386
Patented July 30, 1957

2,801,386
TUBE TESTING SYSTEM

Earl F. Bankston, Macon, Ga., assignor to William E. Burgess, Macon, Ga.

Application May 7, 1951, Serial No. 224,944

2 Claims. (Cl. 324—22)

This invention relates to the testing of electronic discharge tubes of all types and it has for its primary object to provide a testing system so simplified that the average user of a radio or television set may test the tubes of his set to determine whether they are in good working order so that he may be in a position to replace defective tubes himself thus materially reducing the costs of repair of his set.

The testing of tubes, especially of the electronic tubes of a radio set, requires special knowledge and experience on account of the very large number of types of electronic tubes which have been developed so that during testing operation no set of hard and fast rules can be applied for the said operation. An intimate knowledge of the tube construction or the use of a handbook or the like is therefore necessary in order to carry out the testing operation properly, while the testing operation itself is comparatively simple and—with the exception of some tests—amounts to a conductivity test.

In order to cope with this difficulty and especially with the difficulty due to the large number of types of electronic tubes, card sockets are used as test sockets, according to the invention, a special card socket being provided for every type of electronic tube. The card or test socket consists of a sheet of cardboard or plastic in which a number of holes has been made which correspond to the number of base pins of the tube to be tested, the holes being so arranged that the base pins of each type of electronic tubes fit exactly into the holes and those key studs, projections, dummy pins or other means serving as markers for the correct position of the electronic tube in the socket are also provided for by additional holes in the cardsocket so that when the electronic tube is placed on the test socket with the pins of the tube passing through the holes, all its pins in those positions must correspond to the desired position in a genuine socket.

When the electronic tube has thus been placed into a card socket the card identifies the pins held therein by an identification mark such as a number or letter or the like and the test may now proceed by using a conductivity tester, such as a lamp connected with a current outlet by means of a test card provided with a clamp adapted to be clamped on one of the pins and further provided with a test prod the tip of which has to be brought into contact with various other pins according to a directive which is printed on the card socket and which is valid for the particular type of electronic tube only for which the card socket has been adapted.

In this way, if the user of a radio set keeps a set of card sockets each properly provided with socket holes and directives for all current types of electron tubes or for all existing type of tubes or if he keeps a set corresponding to the tubes of his radio or television set, he can test the tubes by means of a lamp tester without any technical experience and without any information other than that provided on the printed indications on the card socket.

Specific objects of the invention will be apparent from the following detailed specification.

The invention is illustrated in the accompanying drawings showing one embodiment thereof. It is however to be understood that the example shown is selected in order to be able to explain the principle of the invention and the best mode of applying said principle. It is believed that the example shown provides indications for the expert permitting to use the principle of the invention in connection with any modification of the structure used and therefore a departure from the example shown in the drawings is not necessarily a departure from the essence of the invention.

In the drawings:

Figure 4 is a table correlating the tube type with the test socket to be used during the test.

Figures 5 to 9 are views of the various test sockets for the different types of tubes to be used during testing operations and also containing the directives to be followed during such operations.

Figure 1:
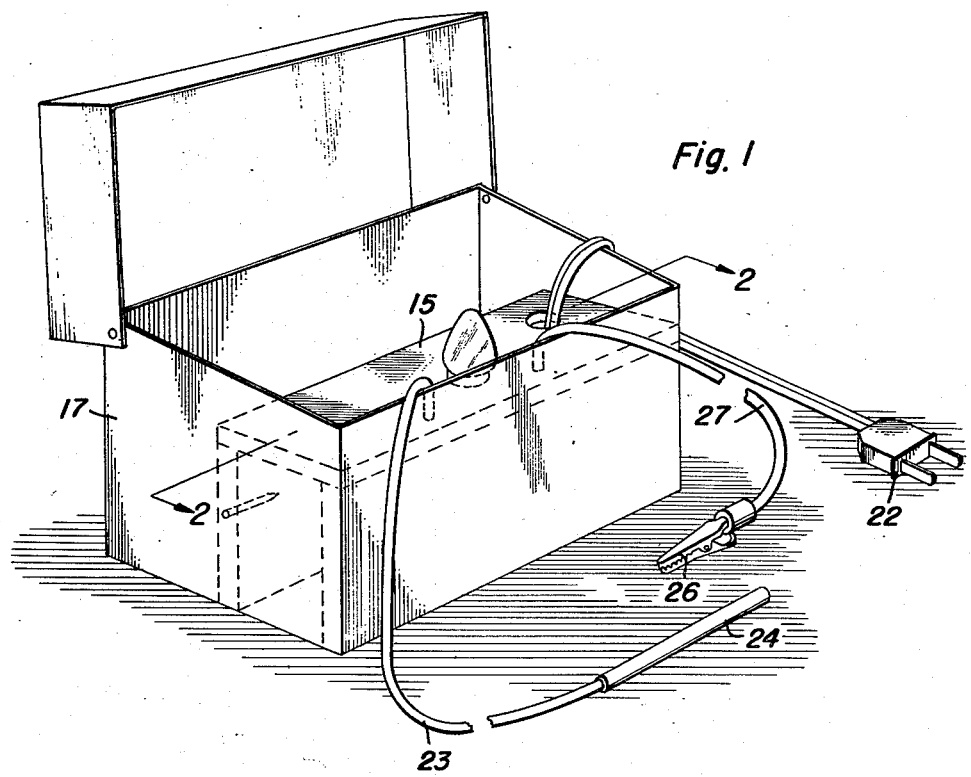
Figure 1 is a perspective view of a testing box showing a lamp tester used in connection with the invention.

As above explained the main object of the invention consists in providing a testing outfit which conveys the necessary information to the person making the test without requiring any activity other than that of following printed directions which do not require experience or expert knowledge of any kind.

In order to transmit the right type of information to the person testing tubes and in order to limit this information to those directives which have to be followed with a particular type of electronic tube under test, a number of test cards or sheets forming card sockets 10 is used, each card socket consisting of a sheet of insulating material, for instance, of a sheet of cardboard, Celluloid or plastic provided on one side (Figure 9) with a circular area 11 delineating the diameter of the tube socket and with socket holes 12 punched into the card socket at those places at which the base pins are arranged on the socket of a tube of the particular type to be tested. Usually the diameter of the socket in conjunction with the spacing of the base pins provides a check for the correct selection of the card socket into which a tube of the type to be tested will fit. As well known, some tubes have however a special key, stud, pin or extension or a central knob with a lateral extension projecting from the tube socket which must fit into a corresponding key hole or cavity of the socket. With test socket cards of this type a corresponding hole 14, as shown, in Figure 9 is also provided in the said test socket cards.

A test socket card is provided for every type of electronic tube. To identify the test socket cards, each is provided with a number, letter or other distinctive sign and the proper test socket card for the tube to be tested must be selected by means of said number or sign from a table which has to accompany a set of test socket cards and which may either contain all the types of electronic tubes on the market and indicate the number of each test socket card allotted to each type number or which may merely contain the types of electronic tubes contained in a given radio or television set and which in this case may be attached to the said sets. The type number or type designation of the tube is clearly marked on each electronic tube and the user of a radio or television set has therefore only to identify this type on a tube which he pulls from his set and to select the proper test socket card by its number, allotted to the type designation, using the above mentioned table for this purpose.

On the reverse side of the test socket card 10 which is shown in Figures 5 to 8 for different cards and which is the side through which the base pins of the tube project when the tube has been inserted into the test socket card on the obverse side, each pin hole is provided with a distinctive number or letter or other character. When a tube has been inserted into a test socket card on the proper side the pins therefore which project through the test socket card are clearly identifiable by these characters. Below that space on the test socket card which is occupied by the holes further space is provided for carrying the testing prescription, preferably in the form of a tabulation, which prescription contains a directive indicating which base pin should be used for the test and what indications are to be expected if the tube functions normally.

Figure 2:
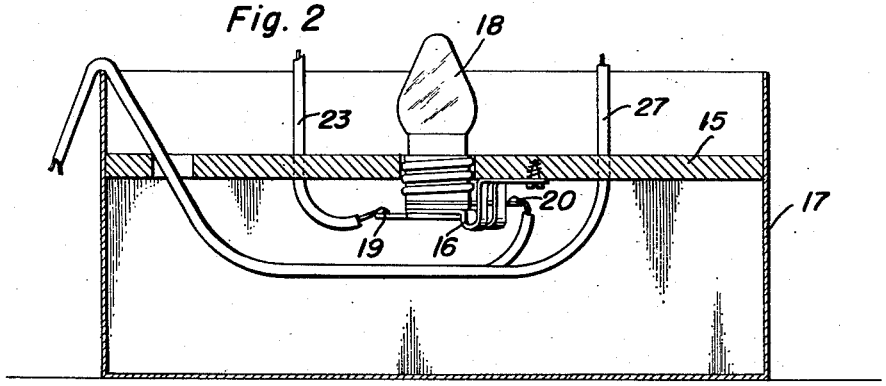
Figure 2 is a sectional elevational view of the said lamp tester used in connection with the invention, a section being taken along the line 2—2 indicated in Figure 1.
Figure 3:
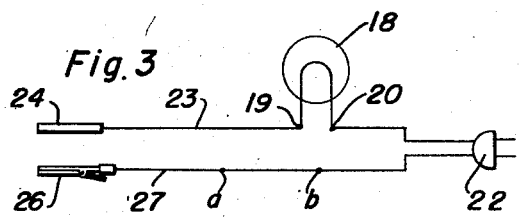
Figure 3 is a wiring diagram of the lamp tester.

For the conductive test of the electronic tube the small test apparatus shown in Figures 1 and 2 may be used. This apparatus consists of a small box carrying a baseboard 15 to which a lamp socket 16 is attached. A lamp 18 is inserted into the lamp socket and the two contacts 19, 20 of the lamp socket are connected with a connection plug 22 and with a test prod 24 respectively. The connections are made by means of flexible wire of a sufficient length to allow manipulation. A test clamp 26 is joined to the second terminal of the connector plug 22 by means of a conductor 27 which, to make the apparatus more handy, preferably also passes through the box 17 and through the baseboard 15. The clamp permits to make a semi-permanent connection for a number of tests and it also identifies the branches of the test circuit and, if need be, the direction of current flow through the conductivity tester. A resistance may be inserted into one of the conductors for instance, between the points marked $a$ and $b$ in order to adapt the tester to existing conditions, voltages or the like.

The testing of an electronic tube is performed by pulling said tube from the radio set in which it was originally held and by inserting it with its base pin into the test socket card which has been previously selected and which corresponds to the type number of the tube to be tested. The connection plug 22 is then inserted into a suitable outlet and the test clamp 24 is attached to the base pin identified by number which is indicated on the reverse side of the test socket cards as shown in Figures 5 to 8. As seen, each of these cards carries a table in which the pins are indicated to which the clamp must be attached to provide a complete test. Usually a number of tests is prescribed and the person testing the tube may simply proceed by touching all the pins including the pins which are sometimes arranged on the top in order to produce separate grid connections or the like. The table informs the testing person when the test lamp 18 is lighted provided the condition of the electronic tube is normal. Any failure of the test lamp to light up when the indicated pin is touched or to cause the appearance of any light upon touching any other pin leads to the conclusion that the tube is defective.

It will therefore be seen that all lamp tests except those during which the current has to be varied in a certain way can be made by using the test socket cards. It will also be seen that the directives are so simple that they can be followed by any one without experience or special training. Therefore the system according to the invention provides a very simple means enabling the ordinary user of a radio set to test the correct operation of the tubes of his set without having to resort to the experience of a professional repair man.

It will be clear that many changes in the unessential features of the system may be made without in any way departing from the essence of the invention as defined by the annexed claims.

Having described the invention, what is claimed as new is:

1. A testing system for performing continuity tests in connection with electronic tubes provided with base pins, using a continuity tester provided with contacting means adapted to contact the said base pins, comprising a number of test socket cards of insulating material, each test socket card being allotted solely to one definite type of electronic tube and being provided with socket holes spaced and arranged for the reception and firm holding of the base pins of the tube to which the test socket card is allotted, said test socket card being further provided with identification marks for each socket hole, said socket holes thus holding the tube to be tested and identifying the base pins of the tube, the contacting means of the continuity tester including a contact temporarily attachable to one of the base pins and a contact prod for a fleeting, short timed contact with the base pins, said test socket card further containing the directives for the attaching of the temporarily attachable contact of the continuity tester and for a series of tests to be conducted, temporarily contacting the contact prod with base pins other than those to which the temporarily attachable contact has been attached, and listing the signals obtainable by contact of the contact prod with the base pins.

2. A testing system for performing continuity tests in connection with electronic tubes provided with spaced base pins and with key studs securing a correct insertion of the tube, using a continuity tester with a lamp connected with a source of currents and conducting means connected with said lamp and source of currents, comprising a number of test socket cards of insulating material, each card being allotted solely to a definite type of electronic tube and each test socket card being numbered for identification of the same in a list of tube types correlating said tube types with the card number, each test socket card being further provided with socket holes spaced and arranged to match the spacing and arrangement of the base pins of the tube type to which the card is allotted and holding the said base pins and tube firmly when inserted into said test socket card, the latter being further provided with keyholes arranged for admitting the key studs for preventing the insertion of a tube of different type and the insertion of a tube of the alloted type in a position differing from the predetermined position, identification marks for the base pins of a tube carried by the test socket card, identifying the base pins projecting through the socket holes on one side of the test socket card, the contact means of the continuity tester including a base pin clamp for a temporary fixed attachment to a projecting base pin during a test series and a prod for a fleeting momentary contact with base pins during a series, said test socket card further being provided with directives for the attachment of the said base pin clamp during the test series, the momentary contacting of the base pins with the prod and for the signals obtainable during such simultaneous contacting of the contact means of the continuity tester with the base pins.

References Cited in the file of this patent

UNITED STATES PATENTS

| | | |
|---|---|---|
| 1,367,285 | Stimmel | Feb. 1, 1921 |
| 1,584,084 | Elliott | May 11, 1926 |
| 1,835,882 | Krippner | Dec. 8, 1931 |
| 1,986,414 | Saunders | Jan. 1, 1935 |
| 2,133,610 | Fausett | Oct. 18, 1938 |
| 2,264,066 | Buchard | Nov. 25, 1941 |
| 2,390,706 | Hearon | Dec. 11, 1945 |

FOREIGN PATENTS

| | | |
|---|---|---|
| 795,331 | France | Mar. 11, 1936 |
| 686,855 | Germany | Jan. 17, 1940 |

OTHER REFERENCES

Receiving Tube Manual Tech. Series RC 14, R. C. A. Mfg. Co., Harrison, N. J. Publ. 1940.

Review of Scientific Instruments, Nov. 1948, page XII.